US012769039B2

(12) United States Patent
An et al.

(10) Patent No.: US 12,769,039 B2
(45) Date of Patent: Oct. 20, 2026

(54) OPTICAL FILM HAVING MULTILAYERED STRUCTURE AND DISPLAY DEVICE COMPRISING SAME

(71) Applicant: KOLON INDUSTRIES, INC., Seoul (KR)

(72) Inventors: Byung-Joon An, Seoul (KR); Sang-Hyun Ahn, Seoul (KR)

(73) Assignee: KOLON INDUSTRIES, INC., Seoul (KR)

( * ) Notice: Subject to any disclaimer, the term of this patent is extended or adjusted under 35 U.S.C. 154(b) by 214 days.

(21) Appl. No.: 18/577,329

(22) PCT Filed: Jul. 13, 2022

(86) PCT No.: PCT/KR2022/010177
§ 371 (c)(1),
(2) Date: Jan. 8, 2024

(87) PCT Pub. No.: WO2023/054866
PCT Pub. Date: Apr. 6, 2023

(65) Prior Publication Data

US 2024/0255682 A1 Aug. 1, 2024

(30) Foreign Application Priority Data

Sep. 29, 2021 (KR) ........................ 10-2021-0128669

(51) Int. Cl.
*G02B 5/20* (2006.01)

(52) U.S. Cl.
CPC .................................... *G02B 5/208* (2013.01)

(58) Field of Classification Search
CPC . G02B 5/208; G02B 1/04; G02B 1/14; C08G 77/04; C09D 183/04; C08K 5/0041; C08K 5/0091; C08K 5/3492; H10K 50/844; H10K 59/87; C08J 7/042; C08J 7/043; C08J 7/046; C08L 83/12
See application file for complete search history.

(56) References Cited

U.S. PATENT DOCUMENTS

2017/0349787 A1* 12/2017 Park ........................ G06F 3/041
2021/0060908 A1 3/2021 Yang
2023/0358932 A1* 11/2023 Ishimaru .................. G02B 5/28

FOREIGN PATENT DOCUMENTS

JP S56-109847 A 8/1981
JP 2001038858 A 2/2001
JP 2004-009737 A 1/2004
JP 2006-523157 A 10/2006
JP 2016-093992 A 5/2016
JP 2019-130890 A 8/2019
(Continued)

OTHER PUBLICATIONS

Office Action from Japanese Patent Office dated Nov. 21, 2024.
(Continued)

*Primary Examiner* — Mariam Qureshi
(74) *Attorney, Agent, or Firm* — Harvest IP Law, LLP

(57) ABSTRACT

The present invention provides an optical film and a display device comprising same, wherein the optical film comprises a light transmitting substrate and a primer layer and has a yellowness ($Y_0$) of 5.0 or less before a light fastness test, a yellowness difference (ΔY.I) of 5.5 or less, and excellent total light transmittance.

12 Claims, 2 Drawing Sheets

101

(56) References Cited

FOREIGN PATENT DOCUMENTS

| | | | |
|---|---|---|---|
| JP | 2020-149064 | A | 9/2020 |
| JP | 2020-152105 | A | 9/2020 |
| JP | 2020-203479 | A | 12/2020 |
| KR | 20100028834 | A | 3/2010 |
| KR | 20180044216 | A | 5/2018 |
| KR | 20190076065 | A | 7/2019 |
| KR | 20190081817 | A | 7/2019 |
| KR | 20190087663 | A | 7/2019 |
| KR | 20200023192 | A | 3/2020 |
| KR | 20200083757 | A | 7/2020 |
| KR | 20210086553 | A | 7/2021 |
| WO | 2008136346 | A1 | 11/2008 |
| WO | 2018/070426 | A1 | 4/2018 |
| WO | 2020/255864 | A1 | 12/2020 |

OTHER PUBLICATIONS

The office action dated Jun. 13, 2024, related to the corresponding Korean Patent application.

The search report dated Apr. 23, 2025, related to the corresponding European Patent application.

* cited by examiner

OPTICAL FILM HAVING MULTILAYERED STRUCTURE AND DISPLAY DEVICE COMPRISING SAME

CROSS REFERENCE TO RELATED APPLICATION(S)

This application is a National Stage of International Application No. PCT/KR2022/010177 filed on Jul. 13, 2022, claiming priority based on Korean Patent Application No. 10-2021-0128669 filed on Sep. 29, 2021, the disclosures of which are incorporated herein by reference in their entireties.

TECHNICAL FIELD

The present disclosure relates to an optical film having a multilayer structure and a display device including the same.

BACKGROUND ART

Recently, the use of an optical film instead of glass as a cover window of a display device has been considered with the goal of reducing the thickness and weight and increasing the flexibility of the display device. In order for the optical film to be usable as a cover window of a display device, the optical film needs to have superior optical properties and excellent mechanical properties.

Meanwhile, an optical film including a polymer resin has problems in that the initial yellowness index is high or the yellowness index is greatly increased over time.

Therefore, there is a need for the development of films having excellent optical properties as well as superior mechanical properties such as insolubility, chemical resistance, and heat resistance.

DISCLOSURE

Technical Problem

Therefore, the present disclosure has been made in view of the above problems, and it is one aspect of the present disclosure to provide an optical film that exhibits excellent scratch resistance (hardness), flexibility, and light resistance.

It is another aspect of the present disclosure to provide a display device including the optical film that exhibits excellent scratch resistance (hardness), flexibility, and light resistance.

Technical Solution

In accordance with one aspect of the present disclosure, provided is an optical film including a light-transmitting substrate and a primer layer, the optical film having a yellowness index before a light resistance test ($Y_0$) of 5.0 or less and a yellowness index difference (ΔY.I) of 5.5 or less, wherein the yellowness index difference (ΔY.I) is a difference ($Y_1-Y_0$) between a yellowness index after the light resistance test ($Y_1$) and the yellowness index before the light resistance test ($Y_0$), and the light resistance test is performed under UV conditions [0.8 W/m$^2$, at 420 nm (863.4 KJ/m$^2$, 30° C./30RH % chamber, 55° C. black panel×300 hr)].

The yellowness index difference (ΔY.I), the color difference before and after the light resistance test ($\Delta E_{ab}$), and the total light transmittance difference (ΔT) of the optical film may satisfy the following Equation 1:

$$(\Delta Y \cdot I - \Delta E_{ab}) / [(\Delta T) \times (\Delta E_{ab} + |\Delta T|)] \geq 1 \quad \text{[Equation 1]}$$

wherein $\Delta E_{ab}$ is a difference between color before the light resistance test and color after the light resistance test, and ΔT is a difference ($T_1-T_0$) between total light transmittance after the light resistance test ($T_1$) and total light transmittance before the light resistance test ($T_0$), with the proviso that, when ΔT is 0 or less, Equation 1 is calculated with ΔT as 0.1, and even when ΔT in |ΔT| is 0 or less, Equation 1 is calculated with the original value of ΔT, not 0.1.

The primer layer may include a curable resin, an ultraviolet absorber, and a pigment, wherein the curable resin includes at least one selected from an acryl-based resin, a urethane-based resin, and a siloxane-based resin.

The curable resin may include a siloxane-based resin prepared by polymerizing a monomer including an alkoxysilane represented by the following Formula 1 and an alkoxysilane represented by the following Formula 2:

<Formula 1>

$$R^1_nSi(OR^2)_{4-n}$$

wherein $R^1$ is a C1-C10 linear, branched or cyclic alkyl group substituted with epoxy or acryl, $R^2$ is a C1-C8 linear, branched or cyclic alkyl group, and n is an integer of 1 to 3, <Formula 2>

$$Si(OR^3)_4$$

wherein $R^3$ is a C1-C4 linear or branched alkyl group.

The primer layer may include 0.01 to 5.00 parts by weight of the ultraviolet absorber based on 100 parts by weight of the curable resin, and 0.01 to 5.00 parts by weight of the pigment based on 100 parts by weight of the curable resin.

The ultraviolet absorber and the pigment may be present at a weight ratio of 50:1 to 100:1 (ultraviolet absorber: pigment).

The ultraviolet absorber may include a hydroxyphenyl triazine-based compound.

The pigment may include a copper-phthalocyanine-based compound.

The primer layer may further include an additive.

The additive may include a polyether siloxane copolymer.

The total light transmittance before the light resistance test ($T_0$) may be 88.0 or more.

The primer layer may have a thickness of 0.1 to 10 μm.

The optical film may further include a hard coating layer on the primer layer, wherein the light-transmitting substrate, the primer layer, and the hard coating layer are stacked in this order.

The hard coating layer may include at least one of a siloxane-based resin, an acryl-based resin, a urethane-based resin, and an epoxy-based resin.

In accordance with another aspect of the present disclosure, provided is a display device including a display panel and the optical film disposed on the display panel.

Advantageous Effects

One embodiment of the present disclosure provides an optical film that exhibits improved light resistance by including a novel primer layer.

Another embodiment of the present disclosure provides a display device including the optical film that exhibits improved light resistance.

BEST MODE

Figure 1:
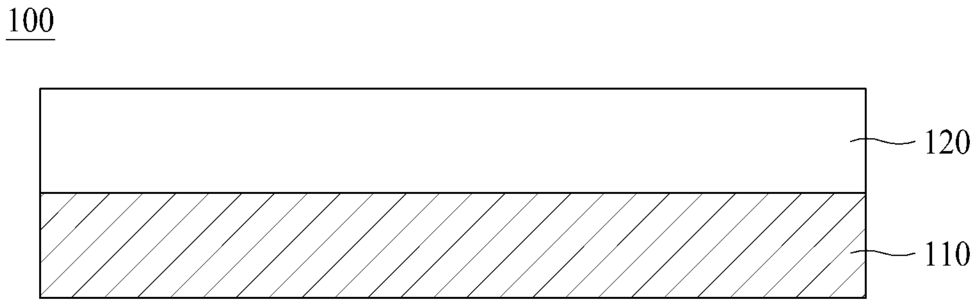
FIG. 1 is a cross-sectional view illustrating an optical film 100 according to an embodiment of the present disclosure.

Hereinafter, embodiments of the present disclosure will be described in detail with reference to the accompanying drawings. However, the following embodiments are illustratively provided merely for clear understanding of the present disclosure, and do not limit the scope of the present disclosure.

The shapes, sizes, ratios, angles, and numbers disclosed in the drawings for describing embodiments of the present disclosure are merely examples, and the present disclosure is not limited to the illustrated details. Like reference numerals refer to like elements throughout the present specification. In the following description, when a detailed description of relevant known functions or configurations is determined to unnecessarily obscure important points of the present disclosure, the detailed description will be omitted.

In the case in which a term such as “comprise”, “have”, or “include” is used in the present specification, another part may also be present, unless “only” is also used. Terms in a singular form may include the plural meanings, unless noted to the contrary. Also, in construing an element, the element is to be construed as including an error range, even if there is no explicit description thereof.

In describing a positional relationship, for example, when the positional relationship is described using “on”, “above”, “below”, or “next to”, the case of no contact therebetween may be included, unless “just” or “directly” is used.

Spatially relative terms, such as “below”, “beneath”, “lower”, “above”, and “upper”, may be used herein to describe the relationship between a device or element and another device or element, as shown in the figures. It will be understood that spatially relative terms are intended to encompass different orientations of a device during the use or operation of the device, in addition to the orientation depicted in the figures. For example, if a device in one of the figures is turned upside down, elements described as “below” or “beneath” other elements would then be positioned “above” the other elements. The exemplary term “below” or “beneath” can, therefore, encompass the meanings of both “below” and “above”. In the same manner, the exemplary term “above” or “upper” can encompass the meanings of both “above” and “below”.

In describing temporal relationships, for example, when a temporal order is described using “after”, “subsequent”, “next”, or “before”, the case of a non-continuous relationship may be included, unless “just” or “directly” is used.

It will be understood that, although the terms “first”, “second”, etc. may be used herein to describe various elements, these elements are not limited by these terms. These terms are only used to distinguish one element from another. Therefore, a first element could be termed a second element within the technical idea of the present disclosure.

It should be understood that the term “at least one” includes all combinations related with one or more items. For example, “at least one among a first element, a second element, and a third element” may include all combinations of two or more elements selected from among the first, second, and third elements, as well as each of the first, second, and third elements.

Features of various embodiments of the present disclosure may be partially or completely integrated or combined with each other, and may be variously interoperated with each other and driven technically. The embodiments of the present disclosure may be carried out independently from each other, or may be carried out together in an interrelated manner.

Prior to the detailed description of the present disclosure below, it should be understood that the terminology used herein is provided only for describing specific embodiments, and is not limited only by the attached claims. All technical and scientific terms used herein have the same meanings as commonly understood by those skilled in the art, unless otherwise mentioned.

In addition, the terms or words used in the present specification and claims below are intended to be interpreted as having meanings and concepts consistent with the technical idea of the present disclosure as described in the present specification, and are not limited to common or dictionary meanings, based on the principle that the inventors can appropriately define the concept of a term in order to best describe the disclosure.

An embodiment of the present disclosure provides an optical film 100. FIG. 1 is a cross-sectional view illustrating the optical film 100 according to an embodiment of the present disclosure.

As shown in FIG. 1, the optical film 100 according to an embodiment of the present disclosure includes a light-transmitting substrate 110 and a primer layer 120.

The optical film 100 according to an embodiment of the present disclosure has a yellowness index before the light resistance test ($Y_0$) of 5.0 or less and a yellowness index difference (ΔY.I) of 5.5 or less. The yellowness index difference (ΔY.I) is the difference ($Y_1-Y_0$) between the yellowness index after the light resistance test ($Y_1$) and the yellowness index before the light resistance test ($Y_0$), and the light resistance test is performed under UV conditions. The yellowness index before the light resistance test ($Y_0$) may be measured using a color difference meter. Specifically, the yellowness index before the light resistance test ($Y_0$) may be measured by cutting the optical film 100 into a specimen with a size of 50 mm×50 mm, measuring a yellowness index of the specimen 5 times using a color difference meter, for example, a color difference meter (model name: CM-3600A) from Konica Minolta, Inc. in accordance with ASTM D1925 in a D65 light source at a viewing angle of 2° in a transmission mode and calculating an average of the measured five yellowness index values. The yellowness index after the light resistance test ($Y_1$) may be measured in the same manner as in the method of measuring the yellowness index before the light resistance test ($Y_0$).

Specifically, the yellowness index difference (ΔY.I) of the optical film 100 is measured as follows. Specifically, the yellowness index before the light resistance test ($Y_0$) of the optical film 100 is measured, and light resistance test of the optical film 100 is performed under the conditions of 0.8

$W/m^2$, at 420 nm (863.4 $KJ/m^2$, 30° C./30RH % chamber, 55° C. black panel×300 hr). The yellowness index ($Y_1$) of the optical film 100 subjected to the light resistance test is measured again. The yellowness index before the light resistance test ($Y_0$) is subtracted from the measured yellowness index after the light resistance test ($Y_1$) to obtain the yellowness index difference (ΔY.I).

When the yellowness index before the light resistance test ($Y_0$) of the optical film 100 is 5.0 or less, and the yellowness index difference (ΔY.I) is 5.5 or less, the optical film 100 is suitable for use as a cover window of the display device due to excellent UV light resistance. Since the polymer resin included in the light-transmitting substrate 110 of the optical film 100 has a large number of aromatic rings, the optical film 100 turns yellow when exposed to light of an ultraviolet (UV) wavelength. Accordingly, the yellowness index of the optical film 100 also increases over time. On the other hand, even when the optical film 100 having excellent UV light resistance is exposed to light of an ultraviolet (UV) wavelength, the increase in yellowness index is small. Since the optical film 100 according to an embodiment of the present disclosure includes the primer layer 120 disposed on the light-transmitting substrate 110, it can be imparted with improved UV light resistance and a yellowness index difference (ΔY.I) of 5.5 or less.

The optical film 100 according to an embodiment of the present disclosure may satisfy the following Equation 1:

$$(\Delta Y\cdot I - \Delta E_{ab})/[(\Delta T)\times(\Delta E_{ab} + |\Delta T|)] \geq 1 \quad \text{[Equation 1]}$$

wherein $\Delta E_{ab}$ is the difference between color before the light resistance test and color after the light resistance test, and ΔT is the difference ($T_1-T_0$) between the total light transmittance after the light resistance test ($T_1$) and the total light transmittance before the light resistance test ($T_0$), with the proviso that Equation 1 is calculated with ΔT as 0.1, when ΔT is 0 or less, and Equation 1 is calculated with the original value of ΔT, not 0.1, even when ΔT in |ΔT| is 0 or less.

The difference between the color before the light resistance test and the color after the light resistance test ($\Delta E_{ab}$) is calculated in accordance with the following Equation 2 using the difference in L*, a*, and b* between before and after the light resistance test of the optical film 100.

$$\Delta E_{ab} = \left[(\Delta L^*)^2 + (\Delta a^*)^2 + (\Delta b^*)^2\right]^{1/2} \quad \text{[Equation 2]}$$

wherein ΔL* is the difference between L* after the light resistance test and L* before the light resistance test, Δa* is the difference between a* the light resistance test and a* before the light resistance test, and Δb* is the difference between b* after the light resistance test and b* before the light resistance test.

L*, a*, and b* of the optical film 100 may be measured using a colorimeter. Specifically, L*, a*, and b* of the optical film 100 may be measured by cutting the optical film 100 into a specimen with a size of 50 mm×50 mm, measuring L*, a*, and b* of the specimen 5 times using a color difference meter, for example, a color difference meter from Konica Minolta, Inc. (model name: CM-3600A) in accordance with ASTM D1925 using a D65 light source at a viewing angle of 2° in a transmission mode, and calculating an average of the measured five L*, a*, and b* values.

The total light transmittance before the light resistance test ($T_0$) may be measured using a haze meter. Specifically, the total light transmittance before the light resistance test ($T_0$) of the optical film 100 may be measured by cutting the optical film 100 into a specimen with a size of 50 mm×50 mm, measuring a total light transmittance of the specimen 5 times using a haze meter, for example, a haze meter from Murakami Color Laboratories (model name: HM-150) in accordance with ASTM D1003, and calculating an average of the measured five total light transmittance values. The total light transmittance after the light resistance test ($T_1$) may be measured in the same manner as in the method of measuring the total light transmittance before the light resistance test ($T_0$).

The optical film 100 according to an embodiment of the present disclosure may satisfy Equation 1 above. As a result of the experimental evaluation of the optical film 100, the inventors of the present disclosure found that, when the yellowness index before the light resistance test ($Y_0$) of the optical film 100 is 5.0 or less, as yellowness index difference (ΔY.I) and color difference ($\Delta E_{ab}$) increase compared to the difference in total light transmittance (ΔT) before and after the light resistance test, light resistance increases. In particular, it was found that, as the yellowness index difference (ΔY.I) and color difference ($\Delta E_{ab}$) increase compared to the value obtained by multiplying the difference (ΔT) in total light transmittance before and after the light resistance test by the "sum of the color difference ($\Delta E_{ab}$) and |ΔT|", light resistance increases. In this case, when ΔT is negative, the entire value obtained by the equation becomes negative, yielding a result contrary to the desired tendency. For this reason, when ΔT is negative, Equation 1 is calculated with ΔT as 0.1. Accordingly, when the optical film 100 satisfies Equation 1, that is, when the value obtained by subtracting the color difference ($\Delta E_{ab}$) of the optical film 100 from the yellowness index difference (ΔY.I) of the optical film 100 is greater than or equal to the value obtained by multiplying the sum of the color difference ($\Delta E_{ab}$) and the absolute value of the difference in total light transmittance (|ΔT|) by the difference in total light transmittance (ΔT), initial yellowness index, yellowness index before and after light resistance test, initial total light transmittance, total light transmittance before and after light resistance test, and color difference before and after light resistance test are excellent.

According to an embodiment of the present disclosure, the optical film 100 may have a total light transmittance before the light resistance test ($T_0$) of 88.0 or more.

The light-transmitting substrate 110 of an embodiment of the present disclosure may include a polymer resin. The polymer resin is suitable for use as a cover window of a flexible display device due to the excellent flexural properties and impact resistance thereof.

The polymer resin may be included in a film in various shapes and forms, such as a solid powder form, a form dissolved in a solution, a matrix form solidified after being dissolved in a solution, etc. Any resin containing the same repeating unit as the resin of the present disclosure may be considered the same as the polymer resin of the present disclosure, regardless of the shape and form thereof. In general, the polymer resin in the film may be present as a solidified matrix obtained by applying a polymer resin solution, followed by drying.

The polymer resin according to an embodiment of the present disclosure may be any light-transmitting resin. For example, the polymer resin may include at least one selected from cycloolefin derivatives, cellulose polymers, ethylene vinyl acetate copolymers, polyester polymers, polystyrene polymers, polyamide polymers, polyamide-imide polymers, polyetherimide polymers, polyacrylic polymers, polyimide polymers, polyether sulfone polymers, polysulfone polymers, polyethylene polymers, polypropylene polymers, polymethylpentene polymers, polyvinyl chloride polymers, polyvinylidene chloride polymers, polyvinyl alcohol polymers, polyvinyl acetal polymers, polyether ketone polymers, polyether ether ketone polymers, polymethyl methacrylate polymers, polyethylene terephthalate polymers, polybutylene terephthalate polymers, polyethylene naphthalate polymers, polycarbonate polymers, polyurethane polymers, and epoxy polymers. Preferably, the polymer resin according to an embodiment of the present disclosure may include at least one of polyimide polymers, polyamide polymers, and polyamide-imide polymers. In particular, polyimide-based polymers, polyamide-based polymers, and polyamide-imide-based polymers exhibit excellent physical properties such as thermal properties, hardness, abrasion resistance, and flexibility, and superior optical properties such as light transmittance and haze. The light-transmitting substrate 110 of the optical film 100 used as a cover window preferably includes at least one of polyimide-based polymers, polyamide-based polymers, and polyamide-imide-based polymers, but the present disclosure is not limited thereto.

According to an embodiment of the present disclosure, the light-transmitting substrate 110 may include a polymer resin including at least one of an imide repeating unit and an amide repeating unit. The light-transmitting substrate 110 may be any one of polyimide substrates, polyamide substrates, and polyamide-imide substrates. However, the embodiments of the present disclosure are not limited thereto, and any substrate may be used as the light-transmitting substrate 110, as long as it is light-transmissive.

The primer layer 120 may include a curable resin, an ultraviolet absorber and a pigment.

In an embodiment of the present disclosure, the curable resin includes at least one selected from an acryl-based resin, a urethane-based resin, and a siloxane-based resin. The curable resin may include any one selected from acryl-based resins, urethane-based resins, and siloxane-based resins according to the type of the light-transmitting substrate 110 and the physical properties of the optical film 100. Preferably, the curable resin may include a siloxane-based resin.

The siloxane-based resin of an embodiment of the present disclosure may be prepared through hydrolysis and condensation between alkoxysilanes including organic materials in the presence of hydroxyl groups. Specifically, the siloxane-based resin of an embodiment of the present disclosure may be prepared by polymerizing a monomer including an alkoxysilane represented by the following Formula 1 and an alkoxysilane represented by the following Formula 2:

<Formula 1>

$$R^1_nSi(OR^2)_{4-n}$$

wherein $R^1$ is a C1-C10 linear, branched or cyclic alkyl group substituted with epoxy or acryl, $R^2$ is a C1-C8 linear, branched or cyclic alkyl group, and n is an integer of 1 to 3, <Formula 2>

$$Si(OR^3)_4$$

wherein $R^3$ is a C1-C4 linear or branched alkyl group.

The hydrolysis and condensation reaction may be carried out at room temperature, but may be stirred at 50 to 120° C. at 100 rpm using a mechanical stirrer for 1 hour to 120 hours to promote the reaction, but the present disclosure is not limited thereto. Here, sodium hydroxide was used as a catalyst for the reaction. However, the catalyst may be selected from the group consisting of acidic catalysts such as hydrochloric acid, acetic acid, hydrogen fluoride, nitric acid, sulfuric acid, iodic acid, basic catalysts such as ammonia, potassium hydroxide, barium hydroxide, and imidazole, ion exchange resins such as Amberite, and combinations thereof. The amount of the catalyst that is added is not particularly limited, but may be 0.0001 to about 10 parts by weight. When the hydrolysis and the condensation are performed, water or alcohol, which is a by-product, is produced. By removing this by-product, the reverse reaction can be reduced so that the forward reaction can be facilitated. Based thereon, the reaction rate can be controlled. In addition, after completion of the reaction, the by-product may be removed by heating under reduced pressure.

According to an embodiment of the present disclosure, an organic solvent may be added to control the viscosity of the siloxane-based resin to further enhance processability and to control the thickness of the coating film, but may not be limited thereto. The amount of the organic solvent that is added is not particularly limited. For example, the organic solvent that can be used includes at least one selected from the group consisting of solvents consisting of ketones such as acetone, methyl ethyl ketone, methyl butyl ketone, and cyclohexanone, cellosolves such as methyl cellosolve and butyl cellosolve, ethers such as ethyl ether and dioxane, alcohols such as isobutyl alcohol, isopropyl alcohol, butanol and methanol, halogenated hydrocarbons such as dichloromethane, chloroform, and trichloroethylene, or hydrocarbons such as n-hexane, benzene, and toluene, but is not limited thereto.

According to an embodiment of the present disclosure, the siloxane-based resin may include an antioxidant in order to suppress an oxidation reaction resulting from a polymerization reaction, but is not limited thereto.

According to an embodiment of the present disclosure, the siloxane-based resin composition may further include a leveling agent or a coating aid, but is not limited thereto.

According to an embodiment of the present disclosure, the polymerization may include light irradiation or heating, but is not limited thereto.

According to an embodiment of the present disclosure, a high-hardness coating cured product may be obtained by photopolymerization and thermal polymerization after molding such as coating, casting, and molding using the siloxane-based resin composition. For the photopolymerization, a uniform surface may be obtained through heat treatment before light irradiation. The photopolymerization may be performed at a temperature not lower than 40° C. and not greater than 300° C., but is not limited thereto. In addition, the amount of light that is irradiated may be not less than 50 mJ/cm$^2$ and not more than 20,000 mJ/cm$^2$, but is not limited thereto.

According to an embodiment of the present disclosure, an initiator, for example, a photopolymerization initiator such as an onium salt or an organometallic salt, or a thermal polymerization initiator such as an amine or imidazole may be further included for polymerization of the siloxane-based resin, but is not limited thereto. The amount of the initiator that is added is not particularly limited and is about 0.5 to 3.0 parts by weight based on 100 parts by weight of the siloxane-based resin.

According to an embodiment of the present disclosure, the primer layer 120 may include a curable resin, an ultraviolet absorber, and a pigment. The primer layer 120 may include 0.01 to 5.00 parts by weight of the ultraviolet absorber based on 100 parts by weight of the curable resin, and 0.01 to 5.00 parts by weight of the pigment based on 100 parts by weight of the curable resin.

The primer layer 120 may include 0.01 to 5.00 parts by weight of the ultraviolet absorber based on 100 parts by weight of the curable resin. When the amount of the ultraviolet absorber exceeds 5.00 parts by weight based on 100 parts by weight of the curable resin, the yellowness index before the light resistance test ($Y_0$) of the optical film 100 may exceed 5.0. When the yellowness index before the light resistance test ($Y_0$) of the optical film 100 exceeds 5.0, the optical film 100 is unsuitable for use as a cover window of a display device. On the other hand, when the amount of the ultraviolet absorber is less than 0.01 parts by weight based on 100 parts by weight of the curable resin, it does not sufficiently absorb ultraviolet rays, the light resistance improvement of the optical film 100 is poor and thus the yellowness index difference (ΔY.I) is higher than 5.5 and Equation 1 above is not satisfied.

The primer layer 120 may include 0.01 to 5.00 parts by weight of the pigment based on 100 parts by weight of the curable resin. When the pigment is more than 5.00 parts by weight based on 100 parts by weight of the curable resin, the transmittance of the optical film 100 is reduced, and the visibility of the optical film 100 is reduced. On the other hand, when the amount of the pigment is less than 0.01 parts by weight based on 100 parts by weight of the curable resin, the yellowness index before the light resistance test ($Y_0$) of the optical film 100 increases, making it unsuitable for use as a cover window of a display device.

The ultraviolet absorber and the pigment may be present at a weight ratio of 50:1 to 100:1 (ultraviolet absorber: pigment).

When the amount of the pigment is greater compared to the weight ratio of the ultraviolet absorber to the pigment, the transmittance of the optical film 100 is reduced and the visibility of the optical film 100 is thus deteriorated. On the other hand, when the amount of the pigment is less compared to the weight ratio of the ultraviolet absorber to the pigment, the yellowness index before the light resistance test ($Y_0$) of the optical film 100 increases, making it unsuitable for use as a cover window of a display device.

According to an embodiment of the present disclosure, the ultraviolet absorber may include a hydroxyphenyl-triazine-based compound. Specifically, the ultraviolet absorber may include 2-hydroxyphenyl-s-triazine or hydroxyphenyl-s-triazine, but the present disclosure is not limited thereto and ultraviolet absorbers other than the hydroxyphenyl triazine-based compound may also be used.

According to an embodiment of the present disclosure, the pigment may include a copper-phthalocyanine-based compound, but the present disclosure is not limited thereto and pigments other than the copper-phthalocyanine-based compound may also be used.

According to an embodiment of the present disclosure, the primer layer 120 may further include an additive. The additive may include an additive that functions to increase the surface energy of the primer layer to improve adhesion during additional functional surface treatment. When the primer layer 120 includes an additive, surface characteristics with a water contact angle of 90° or less can be obtained and thus adhesion can be improved.

According to an embodiment of the present disclosure, the additive may include a polyether siloxane copolymer, but the present disclosure is not limited thereto, and additives other than the polyether siloxane-based polymer may be used.

According to an embodiment of the present disclosure, the primer layer 120 may include 0.1 to 0.5 parts by weight of the additive based on 100 parts by weight of the curable resin. When the amount of the additive is more than 0.5 parts by weight based on 100 parts by weight of the curable resin, the optical film 100 has poor weather resistance, making it unsuitable for use as a cover window of a display device. On the other hand, when the amount of the additive is less than 0.1 parts by weight based on 100 parts by weight of the curable resin, the effect of increasing the surface energy of the optical film 100 may be insufficient and the adhesion may be weakened during additional functional surface treatment on the upper surface.

According to an embodiment of the present disclosure, the primer layer 120 may further include an initiator, for example, a photopolymerization initiator such as an onium salt or an organometallic salt, or a thermal polymerization initiator such as amine or imidazole, but is not limited thereto. The amount of the initiator is not particularly limited and may be about 0.5 to 3.0 parts by weight based on 100 parts by weight of the curable resin.

According to an embodiment of the present disclosure, the optical film 100 may be light-transmissive and flexible. For example, the optical film according to an embodiment of the present disclosure may be bendable, foldable and rollable.

The optical film 100 according to an embodiment of the present disclosure may have an adhesion strength of 5B or more even after siloxane-based functional coating, acryl-based functional coating, or urethane-based functional coating.

According to an embodiment of the present disclosure, the primer layer 120 may have a thickness of 0.1 to 10 μm. Preferably, the primer layer 120 may have a thickness of 1 to 5 μm.

When the thickness of the primer layer 120 is greater than 10 μm, the flexibility of the optical film 100 may be reduced. When the thickness of the primer layer 120 is less than 0.1 μm, the light resistance of the optical film 100 may be reduced.

Figure 2:
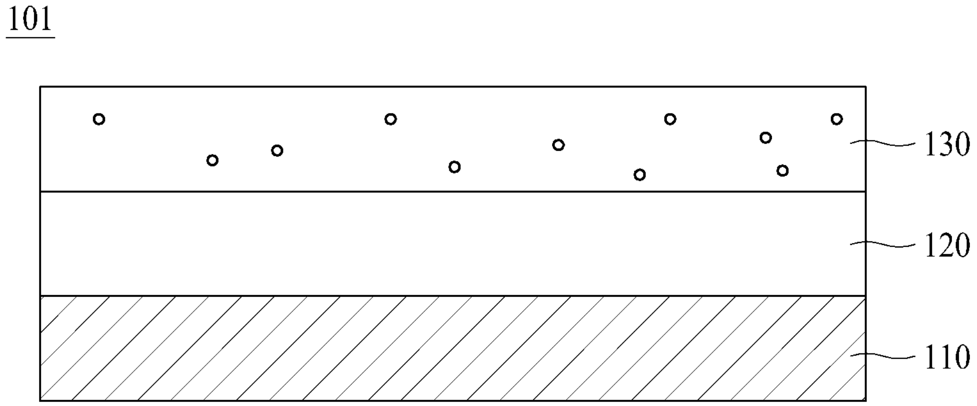
FIG. 2 is a cross-sectional view illustrating an optical film including a hard coating layer 130 according to another embodiment of the present disclosure.

According to an embodiment of the present disclosure, the optical film 101 may further include a hard coating layer 130 on the primer layer 120. FIG. 2 is a cross-sectional view of the optical film 101 further including the hard coating layer 130.

As shown in FIG. 2, the optical film 101 further including the hard coating layer 130 may be stacked in the order of the light-transmitting substrate 110, the primer layer 120, and the hard coating layer 130.

The hard coating layer 130 is a layer that protects the optical film 101 and the adherend, to which the optical film 101 is attached, from the external environment. According to an embodiment of the present disclosure, the hard coating layer 130 may include at least one of a siloxane-based resin, an acryl-based resin, a urethane-based resin, and an epoxy-based resin.

According to an embodiment of the present disclosure, the hard coating layer 130 may have a thickness of 1 to 10 μm, preferably, may have a thickness of 1 to 5 μm. However, the present disclosure is not limited thereto.

The optical film 100 according to an embodiment of the present disclosure may be applied to a display device to protect the display surface of the display panel. The optical film 100 according to an embodiment of the present disclosure may have a thickness sufficient to protect the display panel. For example, the optical film 100 may have a thickness of 20 to 120 μm, but the present disclosure is not limited thereto.

Hereinafter, a display device including the optical film 100 according to an embodiment of the present disclosure will be described with reference to FIGS. 3 and 4.

Figure 3:
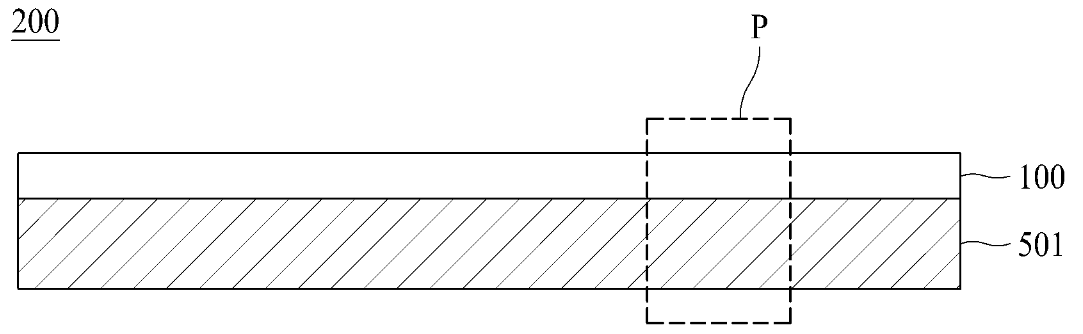
FIG. 3 is a cross-sectional view of a part of a display device 200 according to another embodiment of the present disclosure.
Figure 4:
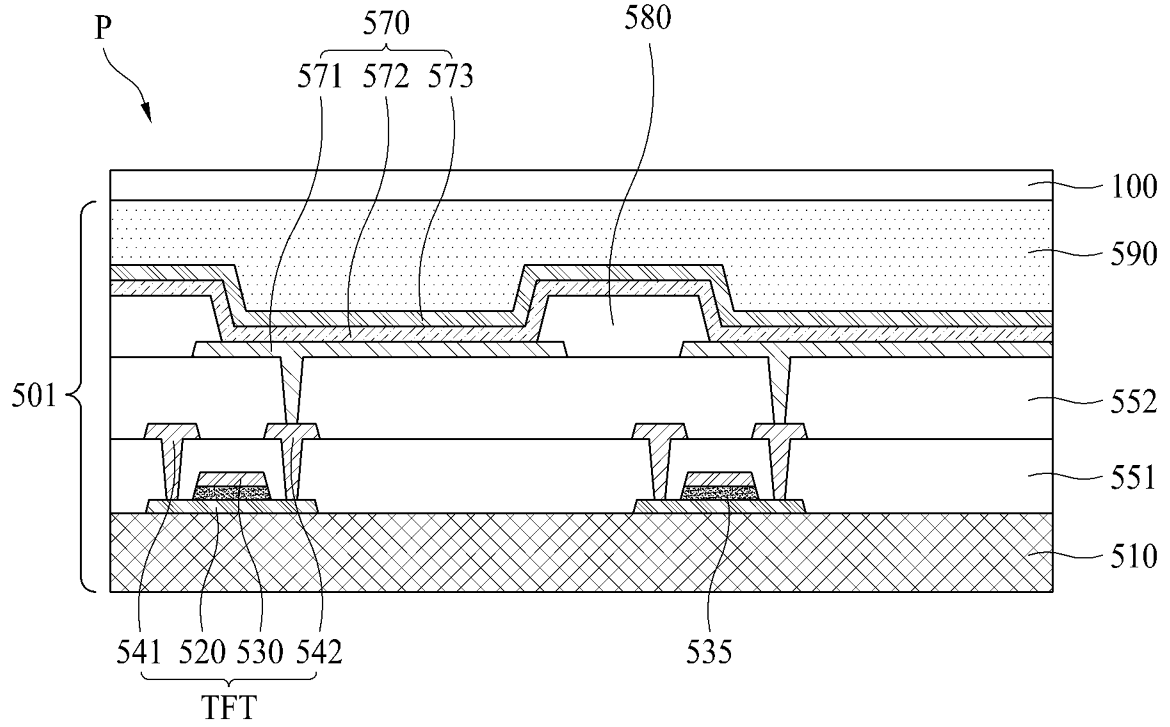
FIG. 4 is an enlarged cross-sectional view illustrating part “P” of FIG. 3.

FIG. 3 is a cross-sectional view illustrating a part of a display device 200 according to another embodiment, and FIG. 4 is an enlarged cross-sectional view of "P" in FIG. 3.

Referring to FIG. 3, the display device 200 according to another embodiment of the present disclosure includes a display panel 501 and an optical film 100 on the display panel 501.

Referring to FIGS. 3 and 4, the display panel 501 includes a substrate 510, a thin film transistor TFT on the substrate 510, and an organic light-emitting device 570 connected to the thin film transistor TFT. The organic light-emitting device 570 includes a first electrode 571, an organic light-emitting layer 572 on the first electrode 571, and a second electrode 573 on the organic light-emitting layer 572. The display device 200 shown in FIGS. 3 and 4 is an organic light-emitting display device.

The substrate 510 may be formed of glass or plastic. Specifically, the substrate 510 may be formed of plastic such as a polymer resin or an optical film. Although not shown, a buffer layer may be disposed on the substrate 510.

The thin film transistor TFT is disposed on the substrate 510. The thin film transistor TFT includes a semiconductor layer 520, a gate electrode 530 that is insulated from the semiconductor layer 520 and at least partially overlaps the semiconductor layer 520, a source electrode 541 connected to the semiconductor layer 520, and a drain electrode 542 that is spaced apart from the source electrode 541 and is connected to the semiconductor layer 520.

Referring to FIG. 4, a gate insulating layer 535 is disposed between the gate electrode 530 and the semiconductor layer 520. An interlayer insulating layer 551 may be disposed on the gate electrode 530, and a source electrode 541 and a drain electrode 542 may be disposed on the interlayer insulating layer 551.

A planarization layer 552 is disposed on the thin film transistor TFT to planarize the top of the thin film transistor TFT.

A first electrode 571 is disposed on the planarization layer 552. The first electrode 571 is connected to the thin film transistor TFT through a contact hole provided in the planarization layer 552.

A bank layer 580 is disposed on the planarization layer 552 in a part of the first electrode 571 to define pixel areas or light-emitting areas. For example, the bank layer 580 is disposed in the form of a matrix at the boundaries between a plurality of pixels to define the respective pixel regions.

The organic light-emitting layer 572 is disposed on the first electrode 571. The organic light-emitting layer 572 may also be disposed on the bank layer 580. The organic light-emitting layer 572 may include one light-emitting layer, or two light-emitting layers stacked in a vertical direction. Light having any one color among red, green, and blue may be emitted from the organic light-emitting layer 572, and white light may be emitted therefrom.

The second electrode 573 is disposed on the organic light-emitting layer 572.

The first electrode 571, the organic light-emitting layer 572, and the second electrode 573 may be stacked to constitute the organic light-emitting device 570.

Although not shown, when the organic light-emitting layer 572 emits white light, each pixel may include a color filter for filtering the white light emitted from the organic light-emitting layer 572 based on a particular wavelength. The color filter is formed in the light path.

A thin-film encapsulation layer 590 may be disposed on the second electrode 573. The thin-film encapsulation layer 590 may include at least one organic layer and at least one inorganic layer, and the at least one organic layer and the at least one inorganic layer may be alternately disposed.

The optical film 100 is disposed on the display panel 501 having the stack structure described above.

Hereinafter, the present disclosure will be described in more detail with reference to exemplary examples and comparative examples. However, the following examples and comparative examples should not be construed as limiting the scope of the present disclosure.

Preparation Example 1: Preparation of Light-Transmitting Substrate 776.655 g of N, N-dimethylacetamide (DMAc) was charged in a 1 L reactor equipped with a stirrer, a nitrogen injector, a dropping funnel, a temperature controller, and a cooler while the reactor was purged with nitrogen. Then, the temperature of the reactor was adjusted to 25° C., 54.439 g (0.17 mol) of TFDB was dissolved therein, and the temperature of the solution was maintained at 25° C. 15.005 g (0.051 mol) of BPDA was further added thereto and completely dissolved therein by stirring for 3 hours and 22.657 g (0.051 mol) of 6FDA was further added thereto and completely dissolved therein. The reactor temperature was lowered to 10° C., and 13.805 g (0.068 mol) of TPC was further added thereto and allowed to react at 25° C. for 12 hours to obtain a polymer solution having a solid content of 12 wt %.

17.75 g of pyridine and 22.92 g of acetic anhydride were added to the obtained polymer solution, stirred for 30 minutes, stirred again for 1 hour at 70° C., and allowed to cool to room temperature. 20 L of methanol was added to the obtained polymer solution to precipitate a solid and the precipitated solid was filtered, pulverized, washed with 2 L of methanol, and dried under vacuum at 100° C. for 6 hours to prepare a polyimide-based polymer solid as a powder. The obtained polyimide-based polymer solid was a polyamide-imide polymer solid.

550 g of DMAC added to a 1 L reactor, the temperature of the reactor was maintained at 10° C. and stirred for a certain period of time. Then, 75 g of the prepared polyimide-based polymer solid powder was added thereto, stirred for 1 hour, and then heated to 25° C. to prepare a liquid polyimide-based resin solution.

Specifically, the obtained polyimide-based resin solution was applied onto a glass substrate using an applicator, and dried with hot air at 130° C. for 30 minutes to produce a film. Then, the produced film was peeled off of the glass substrate and fixed to a frame with pins.

The frame to which the optical film was fixed was slowly heated in a hot air oven from 100° C. to 300° C. for 2 hours, was cooled slowly and separated from the frame to obtain a polyimide-based light-transmitting substrate. The polyimide-based light-transmitting substrate was heated again at 250° C. for 5 minutes to obtain a light-transmitting substrate having a thickness of 50 μm.

Preparation Example 2: Preparation of Curable Resin 2-(3,4-epoxycyclohexyl)ethyltrimethoxysilane (TCI), TEOS (tetraethyl orthosilicate, Sigma-Aldrich), and $H_2O$ were mixed in a ratio of 747.66 mL:38.28 mL:93.88 mL, the mixture was added to a 1,500 mL flask, and then 0.1 g of sodium hydroxide was further added as a catalyst and stirred at 60° C. for 10 hours. Then, the reaction product was filtered using a 0.45 μm Teflon filter to obtain an epoxy-based siloxane resin.

Example 1

600 mL of a dilution of MEK (methyl ethyl ketone) and MIBK (methyl isobutyl ketone) at a ratio of 2:8 was added to the epoxy-based siloxane resin prepared as in Preparation Example 2, IRGACURE 250 (BASF Corporation) as a photoinitiator was added in an amount of 3 parts by weight based on 100 parts by weight of the prepared epoxy-based siloxane resin, Tinuvin 477 (solid content of 80 wt %, BASF Corporation) as an ultraviolet absorber was further added in an amount of 2.5 parts by weight based on 100 parts by weight of the epoxy-based siloxane resin on a solid content basis, Tinuvin 479 (solid content of 100 wt %, BASF Corporation) as an ultraviolet absorber was further added in an amount of 2.5 parts by weight based on 100 parts by weight of the epoxy-based siloxane resin on a solid content basis, Terasol P-Blue-10 (solid content of 10 wt %, AMTE Co., Ltd.) as a pigment was added in an amount of 0.05 parts by weight, based on 100 parts by weight of the epoxy-based siloxane resin on a solid content basis, and Glide 406 (solid content of 50 wt %, TEGO, Inc.) as an additive was added in an amount of 0.25 parts by weight, based on 100 parts by weight of the epoxy-based siloxane resin on a solid content basis to obtain a primer layer coating composition.

The primer layer coating composition was applied using a bar to the upper surface of the polyimide-based light-transmitting substrate prepared as in Preparation Example 1, and then dried at 100° C./10 minutes.

Then, the result was exposed to light with a dose of 1 $J/cm^2$ using an ultraviolet lamp having a wavelength of 315 nm to produce an optical film having a primer layer having a thickness of 1 μm.

Examples 2 to 6

Optical films of Examples 2 to 6 were produced in the same manner as in Example 1, except that the types and contents of ultraviolet absorbers, pigments and additives, the thickness of the primer layer, and the substrate were changed.

Details on the types and contents of ultraviolet absorbers, pigments and additives, the thickness of the primer layer, and the substrate in Examples 2 to 6 are shown in Table 1 below.

Comparative Examples 1 to 6

Optical films of Comparative Examples 1 to 6 were produced in the same manner as in Example 1, except that the types and contents of ultraviolet absorbers, pigments and additives, the thickness of the primer layer, and the substrate were changed.

Details on the types and contents of ultraviolet absorbers, pigments and additives, the thickness of the primer layer, and the substrate in Comparative Examples 1 to 6 are shown in Table 1 below.

TABLE 1

| Item | Ultraviolet absorber and content (parts by weight) | Pigment and content (parts by weight) | Additive and content (parts by weight) | Primer layer thickness (μm) | Substrate |
|---|---|---|---|---|---|
| Example 1 | Tinuvin 477 (2.5 parts by weight), Tinuvin 479 (2.5 parts by weight) | Terasol P-Blue-10 (0.05 parts by weight) | Glide 406 (0.25 parts by weight) | 1 | Polyimide-based light-transmitting substrate of Preparation Example 1 |
| Example 2 | Tinuvin 477 (2.5 parts by weight), Tinuvin 479 (2.5 parts by weight) | Terasol P-Blue-10 (0.05 parts by weight) | Glide 406 (0.25 parts by weight) | 5 | Polyimide-based light-transmitting substrate of Preparation Example 1 |
| Example 3 | Tinuvin 477 (5 parts by weight) | Terasol P-Blue-10 (0.05 parts by weight) | Glide 406 (0.25 parts by weight) | 1 | Polyimide-based light-transmitting substrate of Preparation Example 1 |
| Example 4 | Tinuvin 479 (5 parts by weight) | Terasol P-Blue-10 (0.05 parts by weight) | Glide 406 (0.25 parts by weight) | 1 | Polyimide-based light-transmitting substrate of Preparation Example 1 |
| Example 5 | Tinuvin 477 (1.25 parts by weight), Tinuvin 479 (1.25 parts by weight) | Terasol P-Blue-10 (0.025 parts by weight) | Glide 406 (0.25 parts by weight) | 1 | Polyimide-based light-transmitting substrate of Preparation Example 1 |
| Example 6 | Tinuvin 477 (2.5 parts by weight), Tinuvin 479 (2.5 parts by weight) | Terasol P-Blue-10 (0.05 parts by weight) | Glide 406 (0.25 parts by weight) | 1 | PET substrate (H33L) |
| Comparative Example 1 | — | — | — | 1 | Polyimide-based light-transmitting substrate of Preparation Example 1 |
| Comparative Example 2 | — | Terasol P-Blue-10 (0.05 parts by weight) | Glide 406 (0.25 parts by weight) | 1 | Polyimide-based light-transmitting substrate of Preparation Example 1 |
| Comparative Example 3 | Tinuvin 477 (2.5 parts by weight), Tinuvin 479 (2.5 parts by weight) | — | Glide 406 (0.25 parts by weight) | 1 | Polyimide-based light-transmitting substrate of Preparation Example 1 |
| Comparative Example 4 | Tinuvin 477 (1.25 parts by weight), Tinuvin 479 (1.25 parts by weight) | Terasol P-Blue-10 (0.05 parts by weight) | Glide 406 (0.25 parts by weight) | 1 | Polyimide-based light-transmitting substrate of Preparation Example 1 |

TABLE 1-continued

| Item | Ultraviolet absorber and content (parts by weight) | Pigment and content (parts by weight) | Additive and content (parts by weight) | Primer layer thickness (μm) | Substrate |
|---|---|---|---|---|---|
| Comparative Example 5 | Tinuvin 477 (2.5 parts by weight), Tinuvin 479 (2.5 parts by weight) | Terasol P-Blue-10 (0.01 parts by weight) | Glide 406 (0.25 parts by weight) | 1 | Polyimide-based light-transmitting substrate of Preparation Example 1 |
| Comparative Example 6 | — | — | — | 1 | PET substrate (H33L) |

Tinuvin 477 (BASF Corp.): hydroxyphenyl-s-triazine
Tinuvin 479 (BASF Corp.): 2-hydroxyphenyl-s-triazine
Terasol P-Blue-10 (Amte Co., Ltd.): Cu-phthalocyanine-based compound
Glide 406 (TEGO, Inc.): Solution of polyether siloxane copolymer
H33L (Kolon Industries, Inc., Model name_ASTROLL, Type_H33L): 50 μm thick PET substrate

Measurement Example

The following measurements were performed on the optical films produced in Examples 1 to 6 and Comparative Examples 1 to 6. In the following Measurement Example, yellowness, color difference, and total light transmittance were measured before the light resistance test and were measured again after the light resistance test.

The light resistance test was performed in a 30° C./30RH % light resistance tester chamber (ATLAS, Ci3000) under the UV conditions of 0.8 $W/m^2$ and at 420 nm for 300 hours.

1) Yellowness Index Before Light Resistance Test ($Y_0$) and Yellowness Index after Light Resistance Test ($Y_1$)

Specifically, the yellowness index before the light resistance test ($Y_0$) and the yellowness index after the light resistance test ($Y_1$) were measured by cutting each of the optical films produced according to Examples and Comparative Examples into a specimen with a size of 50 mm×50 mm, measuring a yellowness index of the specimen 5 times using a color difference meter, for example, a color difference meter from Konica Minolta, Inc. (model name: CM-3600A) in accordance with ASTM D1925 in a D65 light source at a viewing angle of 2° in a transmission mode and calculating an average of the measured five yellowness index values.

2) Color Difference Before and After Light Resistance Test ($\Delta E_{ab}$)

The color difference ($\Delta E_{ab}$) before and after the light resistance test was calculated in accordance with Equation 2 below using the difference in L*, a*, and b* between before and after the light resistance test of each of the optical films produced according to Examples and Comparative Examples.

$$\Delta E_{ab} = \left[(\Delta L^*)^2 + (\Delta a^*)^2 + (\Delta b^*)^2\right]^{1/2} \quad \text{[Equation 2]}$$

wherein ΔL* is the difference between L* after the light resistance test and L* before the light resistance test, Δa* is the difference between a* after the light resistance test and a* before the light resistance test, and Δb* is the difference between b* after the light resistance test and b* before the light resistance test.

L*, a*, and b* of the optical film 100 may be measured using a colorimeter. Specifically, L*, a*, and b* of the optical film 100 may be measured by cutting the optical film 100 into a specimen with a size of 50 mm×50 mm, measuring L*, a*, and b* of the specimen 5 times using a color difference meter, for example, a color difference meter from Konica Minolta, Inc. (model name: CM-3600A) in accordance with ASTM D1925 in a D65 light source at a viewing angle of 2° in a transmission mode, and calculating an average of the measured L*, a*, and b* values.

3) Total Light Transmittance after Light Resistance Test ($T_1$) and Total Light Transmittance Before Light Resistance Test ($T_0$)

The total light transmittance before and after light resistance test ($T_0$ and $T_1$) of each of the optical films produced according to Examples and Comparative Examples were measured by cutting the optical film into a specimen with a size of 50 mm×50 mm, measuring a total light transmittance of the specimen 5 times using a haze meter, for example, a haze meter from Murakami Color Laboratories (model name: HM-150) in accordance with ASTM D1003, and calculating an average of the measured five total light transmittance values.

4) Value of Equation 1

The yellowness index before the light resistance test ($Y_0$), the yellowness index after the light resistance test ($Y_1$), the color difference ($\Delta E_{ab}$) before and after the light resistance test, the total light transmittance after the light resistance test ($T_1$) and the total light transmittance before the light resistance test ($T_0$), which are measured above, are applied to the following Equation 1 to obtain the value of Equation 1:

$$(\Delta Y \cdot I - \Delta E_{ab}) / [(\Delta T) \times (\Delta E_{ab} + |\Delta T|)] \quad \text{[Equation 1]}$$

The results of measurement are shown in the following Table 2.

TABLE 2

| Item | $Y_0$ | $Y_1$ | ΔY.I | $\Delta E_{ab}$ | $T_0$ | $T_1$ | Difference in total light transmittance (ΔT) | Value of Equation 1 |
|---|---|---|---|---|---|---|---|---|
| Example 1 | 2.89 | 7.87 | 4.98 | 3.18 | 89.9 | 89.7 | −0.2 | 5.3 |
| Example 2 | 4.09 | 6.05 | 1.96 | 1.22 | 89.5 | 89.5 | 0 | 6.1 |
| Example 3 | 2.93 | 7.90 | 4.97 | 3.16 | 90.0 | 89.9 | −0.1 | 5.6 |
| Example 4 | 2.80 | 7.83 | 5.03 | 3.22 | 89.7 | 89.5 | −0.2 | 5.3 |
| Example 5 | 2.62 | 7.93 | 5.31 | 3.45 | 90.4 | 90.1 | −0.3 | 5.0 |
| Example 6 | 0.62 | 0.85 | 0.25 | 0.18 | 89.5 | 89.3 | −0.2 | 1.9 |
| Comparative Example 1 | 3.03 | 8.62 | 5.59 | 3.70 | 88.5 | 89.4 | 0.9 | 0.6 |

TABLE 2-continued

| Item | $Y_0$ | $Y_1$ | ΔY.I | $\Delta E_{ab}$ | $T_0$ | $T_1$ | Difference in total light transmittance (ΔT) | Value of Equation 1 |
|---|---|---|---|---|---|---|---|---|
| Comparative Example 2 | 2.20 | 7.85 | 5.65 | 3.72 | 90.1 | 90.8 | 0.7 | 0.6 |
| Comparative Example 3 | 5.51 | 10.42 | 4.98 | 3.19 | 90.8 | 90.8 | 0 | 5.6 |
| Comparative Example 4 | 2.45 | 7.77 | 5.32 | 3.47 | 89.8 | 90.6 | 0.8 | 0.5 |
| Comparative Example 5 | 5.18 | 10.18 | 5.00 | 3.20 | 90.3 | 90.3 | 0 | 5.6 |
| Comparative Example 6 | 0.45 | 0.91 | 0.46 | 0.28 | 89.7 | 87.7 | −2.0 | 0.8 |

As can be seen from the results of measurement of Table 2, all of the optical films of Examples 1 to 6 of the present disclosure had a yellowness index before the light resistance test ($Y_0$) of 5.0 or less, a yellowness index difference (ΔY.I) of 5.5 or less, and the value calculated by Equation 1 of 1 or more.

However, the optical films of Comparative Examples 1 to 6 had the yellowness index before the light resistance test ($Y_0$) of 5.0 or less, the yellowness index difference (ΔY.I) greater than 5.5, or the value calculated by Equation 1 less than 1.

The features, structures, effects, and the like described in each of the above-described embodiments may be combined or modified into other embodiments by those skilled in the art to which the embodiments pertain. Accordingly, content relating to such combinations and modifications should be interpreted as falling within the scope of the present disclosure.

DESCRIPTION OF REFERENCE NUMERALS

100, 101: Optical film
110: Light-transmitting substrate
120: Primer layer
130: Hard coating layer
200: Display device
501: Display panel

The invention claimed is:

1. An optical film comprising a light-transmitting substrate and a primer layer, wherein the primer layer comprises:

a curable resin;

an ultraviolet absorber; and a pigment, wherein the curable resin comprises at least one selected from an acryl-based resin, a urethane-based resin, and a siloxane-based resin, wherein the ultraviolet absorber and the pigment are present at a weight ratio of 50:1 to 100:1 (ultraviolet absorber:pigment), wherein the optical film having a yellowness index before a light resistance test ($Y_0$) of 5.0 or less and a yellowness index difference (ΔY.I) of 5.5 or less, wherein the yellowness index difference (ΔY.I) is a difference ($Y_1$-$Y_0$) between a yellowness index after the light resistance test ($Y_1$) and the yellowness index before the light resistance test ($Y_0$), and the light resistance test is performed under UV conditions [0.8 W/m$^2$, at 420 nm (863.4 kJ/m$^2$, 30° C./30RH % chamber, 55° C. black panel×300 hr)], wherein the yellowness index difference (ΔY.I), a color difference before and after the light resistance test ($\Delta E_{ab}$), and a total light transmittance difference (ΔT) of the optical film satisfy the following Equation 1:

$$(\Delta Y.I-\Delta E_{ab})/[(\Delta T)\times(\Delta E_{ab}+|\Delta T|)]\geq 1 \quad \text{[Equation 1]}$$

wherein ΔEab is a difference between color before the light resistance test and color after the light resistance test; and ΔT is a difference ($T_1$-$T_0$) between total light transmittance after the light resistance test (T1) and total light transmittance before the light resistance test ($T_0$), with the proviso that, when ΔT is 0 or less, Equation 1 is calculated with ΔT as 0.1, and even when ΔT in |ΔT| is 0 or less, Equation 1 is calculated with the original value of ΔT, not 0.1.

2. The optical film according to claim 1, wherein the curable resin comprises a siloxane-based resin prepared by polymerizing a monomer including an alkoxysilane represented by the following Formula 1 and an alkoxysilane represented by the following Formula 2:

<Formula 1>

$$R^1_nSi(OR^2)_{4-n}$$

wherein $R^1$ is a C1-C10 linear, branched or cyclic alkyl group substituted with epoxy or acryl;

$R^2$ is a C1-C8 linear, branched or cyclic alkyl group; and n is an integer of 1 to 3, <Formula 2>

$$Si(OR^3)_4$$

wherein $R^3$ is a C1-C4 linear or branched alkyl group.

3. The optical film according to claim 1, wherein the primer layer comprises:

0.01 to 5.00 parts by weight of the ultraviolet absorber based on 100 parts by weight of the curable resin; and 0.01 to 5.00 parts by weight of the pigment based on 100 parts by weight of the curable resin.

4. The optical film according to claim 1, wherein the ultraviolet absorber comprises a hydroxyphenyl triazine-based compound.

5. The optical film according to claim 1, wherein the pigment comprises a copper-phthalocyanine-based compound.

6. The optical film according to claim 1, wherein the primer layer further comprises an additive.

7. The optical film according to claim 6, wherein the additive comprises a polyether siloxane copolymer.

8. The optical film according to claim 1, wherein the total light transmittance before the light resistance test ($T_0$) is 88.0 or more.

9. The optical film according to claim 1, wherein the primer layer has a thickness of 0.1 to 10 μm.

10. The optical film according to claim 1, further comprising a hard coating layer on the primer layer, wherein the light-transmitting substrate, the primer layer, and the hard coating layer are stacked in this order.

11. The optical film according to claim 10, wherein the hard coating layer comprises at least one of a siloxane-based resin, an acryl-based resin, a urethane-based resin, and an epoxy-based resin.

12. A display device comprising:

a display panel; and the optical film according to claim 1 disposed on the display panel.

* * * * *